Jan. 20, 1970  V. E. STEWART, JR  3,491,244
RADIATION SENSITIVE POSITION ENCODER USING CODED DISCS
Filed Dec. 15, 1967  3 Sheets-Sheet 2
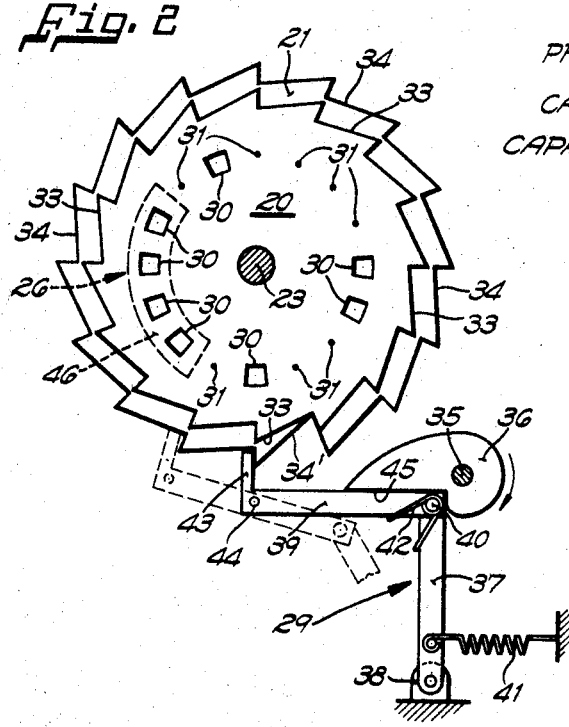
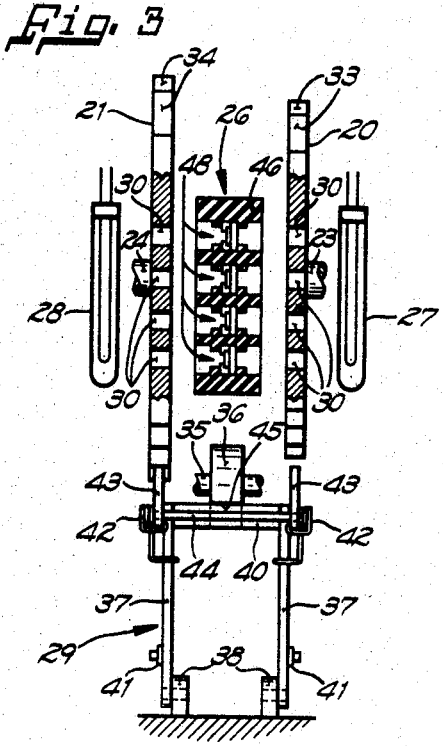
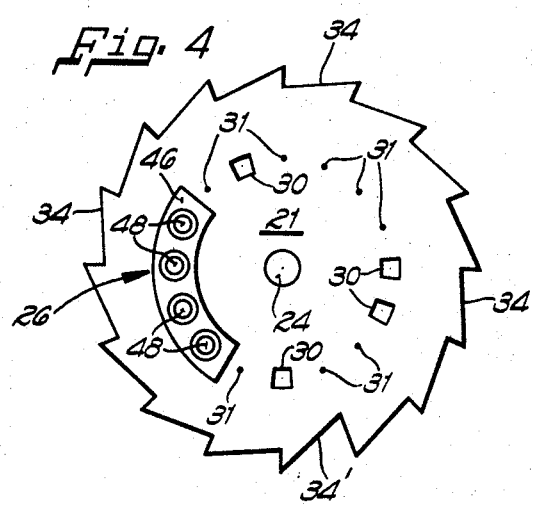
INVENTOR.
Victor E. Stewart, Jr.
BY Fred Wirott
Attorney Jan. 20, 1970     V. E. STEWART, JR     3,491,244
RADIATION SENSITIVE POSITION ENCODER USING CODED DISCS
Filed Dec. 15, 1967     3 Sheets-Sheet 3
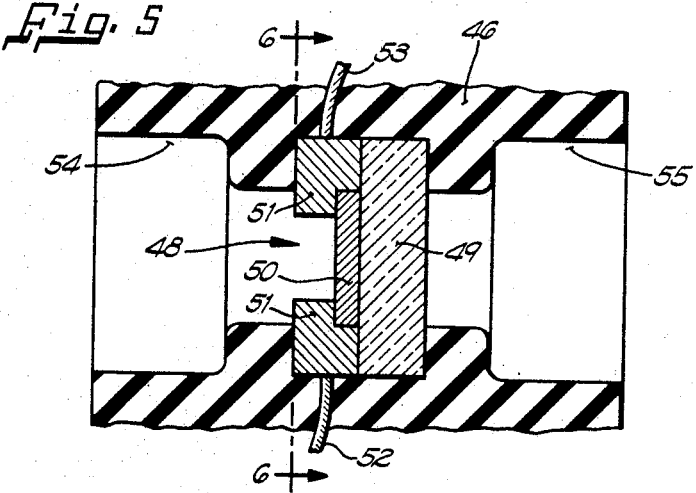
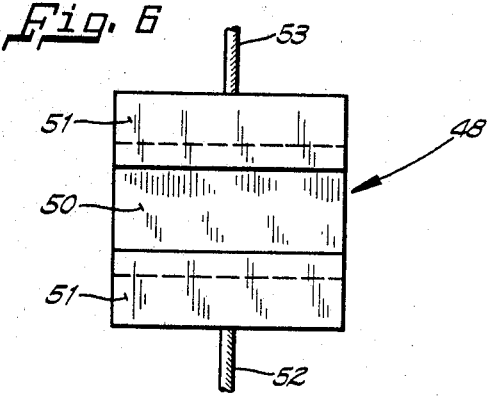
INVENTOR.
Victor E. Stewart, Jr.
BY Fred Wuriott
Attorney United States Patent Office 3,491,244
Patented Jan. 20, 1970

3,491,244
RADIATION SENSITIVE POSITION ENCODER USING CODED DISCS
Victor E. Stewart, Jr., South Milwaukee, Wis., assignor to McGraw-Edison Company, Milwaukee, Wis., a corporation of Delaware
Filed Dec. 15, 1967, Ser. No. 691,020
Int. Cl. G01n *21/30;* H01j *39/12*
U.S. Cl. 250—219
11 Claims

ABSTRACT OF THE DISCLOSURE

A position encoder for use in an automatic remote meter reading system and including a pair of coded discs disposed in a parallel relation and each having an array of position coding elements. A plurality of photocells are disposed between the discs and are arranged to be selectively energized from their opposite sides by individual illuminating means associated with each disc. The presence or absence of illumination on each photocell is operative to modify the parameters of an oscillating circuit so that a different tone signal will be provided to an interrogator for each position of the coded discs.

BACKGROUND OF THE INVENTION

This invention relates to an encoding device and, more particularly, to a device for converting an analog quantity representing the position of the shaft or other movable member into a digital quantity for transmission to a remote location. The invention has particular, but not exclusive, application to systems for the automatic remote reading of utility meters from a control station.

Utility meters, such as electric, gas and water meters, are generally widely distributed at the customers' points of useage. It is the present practice in the reading of such meters for a meter reader to visit each customer's site and to observe and record the registration on each unit. While there have been a large number of proposals for the automatic reading of such meters from a remote location, they have not been commercially adapted because of their high cost and because they could not meet the limitations imposed by existing utility meters and communication systems. Such limitations include the relatively confined space available for encoding devices in utility metering equipment presently installed.

It is an object of the invention to provide an economical encoding and signal transmitting assembly.

Another object of the invention is to provide an encoding and transmitting device which may be incorporated into relatively confined space.

These and other objects and advantages of the invention will become apparent from the description of the preferred embodiment hereinbelow.

BRIEF DESCRIPTION OF THE DRAWINGS

FIGS. 2, 3 and 4 illustrate the coded disc portion of the encoding device according to the instant invention;

FIG. 5 illustrates a bi-directional, photosensitive device useable in the encoder illustrated in FIGS. 2 and 3;

FIG. 6 is a view taken along lines 6—6 of FIG. 5; and

FIG. 7 is a table illustrating an example of the binary code produced by the coded discs shown in FIGS. 3, 4 and 5.

DESCRIPTION OF THE PREFERRED EMBODIMENT

Figure 1:
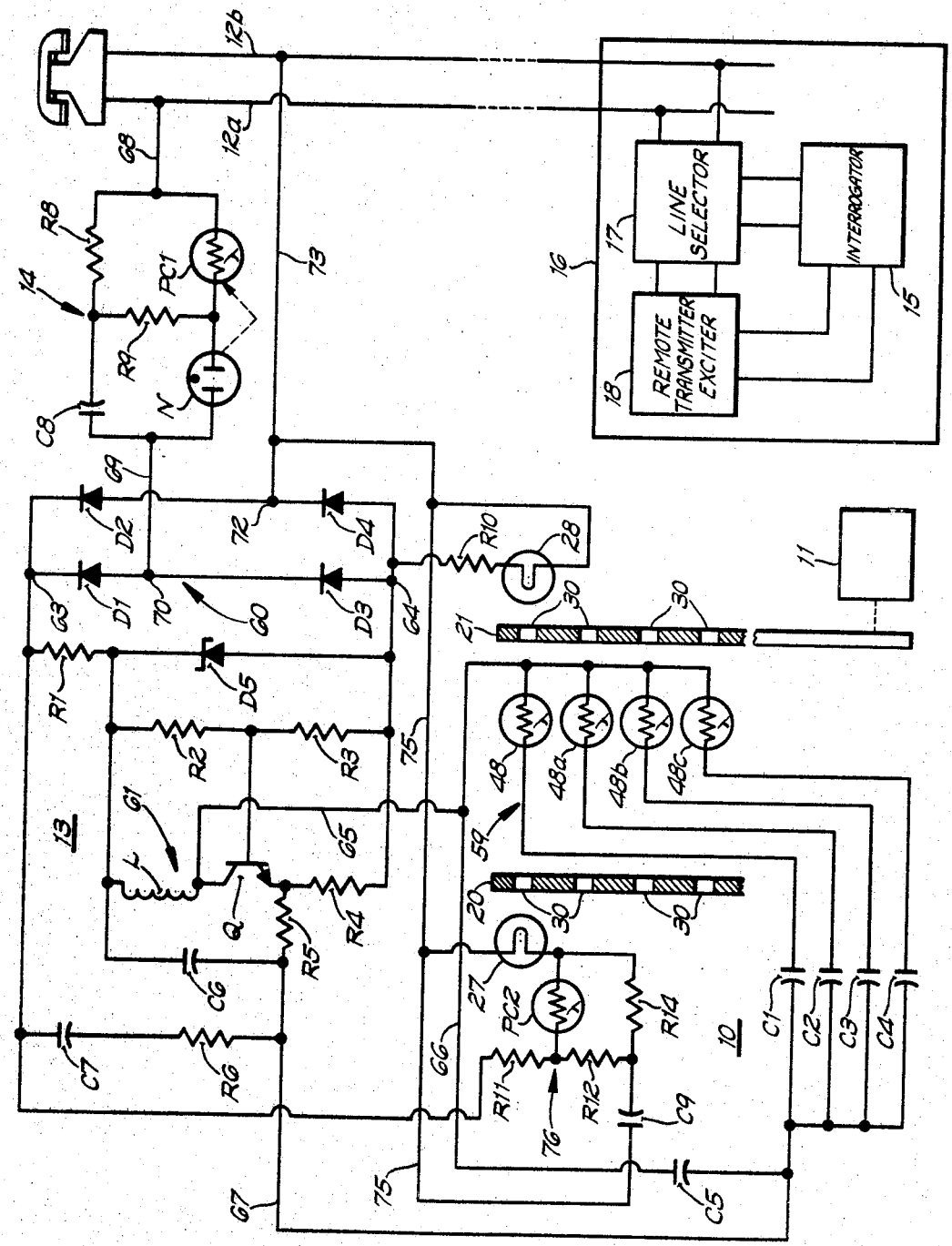
FIG. 1 shows a remote meter reading system incorporating the encoder and transmitter, according to the instant invention.

FIG. 1 shows an automatic remote meter reading system in which an encoder 10, according to the instant invention, may be employed. The encoder 10 may be suitably coupled to the meter 11 which is to be read and to the customer's telephone lines 12a and 12b through a transponder 13 and a line coupler 14. An interrogator 15 at the telephone exchange 16 is coupled to the lines 12a and 12b through a line selector 17, a remote transmitter exciter 18 and the telephone network, not shown.

The details of the meter 11, the interrogator 15, the line selector 17 and the remote transmitter exciter 18 form no part of the instant invention and, accordingly, will not be discussed in detail. It is sufficient for purposes of understanding the instant invention to note that when it is desired to read the meter 11, the interrogator 15 is actuated and in turn actuates the line selector 17 and the remote transmitter exciter 18. The line selector 17 couples the interrogator 15 and the remote transmitter exciter 18 to the particular customer's lines 12a and 12b. The remote transmitter exciter 18 then sends a signal through the lines 12a and 12b which actuates the line coupler 14 whereby the encoder 10 and the transponder 13 are actuated and coupled to the lines 12a and 12b. The encoder 10 provides the coded information corresponding to the registration of meter 11 to the transponder 13 which, in turn, transmits the information to the interrogator 15. The transponder 13 may take the form of an oscillator, and the encoder may change the parameters of the oscillating circuit as a function of the meter registration, whereby tone signals will be placed on the line 12a and 12b in accordance with the reading of meter 11.

FIGS. 2 and 3 show the encoding device 10 in greater detail to include a pair of coded discs 20 and 21 which are respectively mounted for rotation about central shafts 23 and 24, a sensor assembly 26, a pair of lamps 27 and 28 and a drive assembly 29 for coupling the discs 20 and 21 to the meter being read.

The discs 20 and 21 are provided with an array of coding units, one coding unit being provided for each disc position. In the illustrated embodiment, wherein each of the discs 20 and 21 has sixteen positions, sixteen coding units are provided on each disc. Also, where the sensor assembly 26 is photosensitive, the coding units comprise transparent positions or holes 30 and opaque or unperforated positions 31. As seen in FIG. 2, the coding units 30 and 31 are arranged on the disc 20 in a substantially equally spaced circular array. A similar array of coding units 30 and 31 are arranged on the disc 21. As will be pointed out more fully hereinbelow, the arrangement of holes 30 and unperforated positions 31 are such that, when used with at least a four-unit sensor assembly 26, an unambiguous code will be provided for each of the sixteen positions of the discs 20 and 21.

In addition, the outer periphery of each of the discs 20 and 21 may be provided with sixteen teeth 33 and 34, respectively, which are cooperatively engageable by the drive assembly 29. One of the teeth 33 and 34 may be disposed adjacent each of the coding units 30 and 31 on their respective discs 20 and 21.

The drive assembly 29 includes a scroll cam member 36 which is fixed to a shaft 35 coupled to the meter being read.

The cam 36 cooperatively engages a pawl assembly for stepping the discs 20 and 21 and which comprises a first pair of parallel links 37 having one end pinned at fixed pivot point 38 and a second pair of links 39 pivotally coupled to the other end of links 38 by knee pin 40. Springs 41 hold pin 40 in resilient engagement with the cam 36 and springs 42 tend to produce clockwise rotation of links 39 to urge fingers 43 carried by their free ends into engagement with the teeth 33 and 34 on discs 20 and 21.

The diameter of the disc 21 is sufficiently greater than that of the disc 20 so that the radially outward extremity of disc 20 does not extend to the innermost portion of the teeth 34. As a result, one of the fingers 43 will engage the teeth 34 on disc 21 but the other finger 43 will normally be held out of engagement with the teeth 33 of disc 20 by a pin 45 which couples the ends of links 39. However, one of the teeth 34 and the disc 21, and designated 34′, is deeper than the remaining teeth so that the teeth 33 on disc 20 will extend past its inner extremity.

As those skilled in the art will appreciate, the cam member 36 may be coupled to the meter 11 by a gear drive (not shown) in such a manner that the cam member 36 will make one revolution for each of a predetermined number of revolutions in the meter assembly (not shown). As the cam member 36 rotates clockwise, as seen in FIG. 2, the links 37 and 39 are moved from their full to their phantom position wherein the finger 43 will move into engagement with the succeeding ones of the teeth 34 on disc 21. As the cam member 36 completes one revolution, wherein its flat portion 45 is moved into engagement with the pin 40, the spring 41 will rapidly return links 37 and 39 to their full position, thereby moving the disc 21 one position in the counterclockwise direction. The disc 20 will remain stationary, however, because the other finger 43 will be held out of engagement with its teeth 33 by the larger outer periphery of the disc 21 and the pin 44.

After the disc 21 has completed one revolution wherein the tooth 34′ is in a position to be engaged by the one finger 43, the greater depth of tooth 34′ will allow engagement between the other finger 43 and one of the teeth of the disc 20. In this manner, the disc 20 will be moved one position for each complete revolution of the disc 21.

As seen in FIGS. 2, 3 and 4, the sensor assembly 26 may comprise an opaque arcuate head 46 which is disposed between the discs 20 and 21 and in close parallelism thereto. When sixteen-position discs are provided, the sensor assembly 26 includes at least four sensor units 48, 48a, 48b and 48c, which may be spaced along the arcuate head 46 at the same distance as that between the coding units 30 and 31.

Because each of the sensor units 48, 48a, 48b and 48c are identical, only unit 48 will be discussed in detail. As seen more particularly in FIG. 5, sensor unit 48 is shown to include a substrate 49 of a transparent material, such as glass, and a photosensitive layer 50, such as cadmium sulphide deposited on one side of the glass substrate 49. As those skilled in the art will appreciate, cadmium sulfide is a material normally having a high resistance and which changes to a low resistance state upon being illuminated. The photosensitive layer 50 may be disposed on a central portion of the glass substrate 49, and the upper and lower ends thereof are connected to conductive electrode members 51 for placing the photosensitive material 50 in circuit with conductors 52 and 53. The opposite sides of the sensor unit 48 are exposed through a pair of apertures 54 and 55 provided in the sensor head 49.

Because the sensor units 48–48c comprise a photosensitive material 50 deposited on a transparent substrate 49, they can be illuminated from either direction and, accordingly, a single sensor assembly 26 may be disposed between the discs 20 for sensing the position of each.

Each of the sensor units 48–48c is arranged so that for each position of the discs 20 and 21 one of the sensor units will face one of the coding units 30 or 31 in each of the discs 20 and 21. The lamps 27 and 28 are disposed adjacent the outer surfaces of each of the discs 20 and 21 and in an opposed relation to the sensor assembly 26. As will be pointed out more fully hereinbelow, the lamps 27 and 28 are connected to be sequentially energized so that the sensor units 48–48c will be selectively energized through the holes 30 in the disc 20 by light emitted from the lamp 27 and then from the opposite side through holes 30 in the disc 21 by light emitted from the lamp 28. The position code for the disc 20 will be determined by which ones of the sensor units 48–48c are energized when the lamp 27 is lit and, similarly, the position code for the disc 21 will be determined by which ones of the sensor units 48–48c are illuminated when the lamp 28 is lit. It will be understood that only those sensor units 48–48c which are opposite a hole 30 in the appropriate one of the discs 20 or 21 will be illuminated, while those adjacent an unperforated position will remain unenergized.

The holes 30 are shown in FIGS. 2 and 4 to be configured with sides that are generally parallel to those of any immediately adjacent hole. This provides greater optical isolation between adjacent ones of the sensor units 48–48c than would be possible with circular holes of substantially the same area.

If the position of the discs 20, as shown in FIGS. 2, 3 and 4 is taken as a first position, each of the photosensitive units 48–48c will be illuminated when the lamps 27 and 28 are lit. As the discs 20 and 21 are stepped counterclockwise through each of their sixteen positions, a different arrangement of photosensitive units 48–48c will be illuminated to provide the sixteen position unambiguous code shown in FIG. 7.

Reference is again made to FIG. 1 which illustrates how the sensor units are coupled to the transponder 13. More specifically, the sensor units 48, 48a, 48b and 48c are respectively connected in series with capacitors C1, C2, C3 and C4, and the series combinations are connected in parallel with each other and with a capacitor C5. As wil become more apparent hereinbelow, the sensor units 48–48c and the capacitors C1–C4 comprise a capacitive incrementing circuit 59 with respect to capacitor C5.

The transponder 13 may include a diode bridge 60 and an oscillator circuit 61. The diode bridge consists of diodes D1, D2, D3 and D4 which are connected between the oscillating circuit 61 and the encoder 10 on the one hand, and the coupling circuit 14 on the other. When the coupling circuit 14 is active, a D.C. voltage will be supplied to the output terminals 63 and 64 of the diode bridge 60. A Zener diode D5 and a resistor R1 may be connected in series across the conductors 63 and 64 for providing a voltage source for the oscillator 61.

Oscillator 61 includes an amplifier comprising a transistor Q and a first pair of resistors R2 and R3 which are connected in series across Zener diode D5 and their junction connected to the base of transistor Q and a third resistor R4 which is connected between the emitter of Q and terminal 64. Oscillator 61 also includes a Colpitts feedback circuit consisting of an inductance L connected between the collector of Q and the other terminal of resistor R2, and a first capacitor C6 connected between the other terminal of inductor L and by resistor R5 to the emitter of transistor Q. Capacitor C5 constitutes a second capacitance in the Colpitts feedback circuit and is connected by conductors 65, 66 and 67 and resistor R4 between the emitter and collector of transistor Q.

The transponder 13 also includes a resistor R6 and a capacitor C7 which are connected in series between the terminal 63 and resistor R4. Capacitor C7 functions to decouple the emitter of Q from terminal 63, and R6 desenitizes the oscillator output frequency to changes in the impedance of the lines 12a and 12b.

The coupling circuit 14 includes a photocell PC1 and a neon lamp N which are connected in series with each other and by conductors 68 and 69 between one of the customer lines 12a and one input terminal 70 of the diode bridge 60. The coupling circuit also includes a resistor R8 and a capacitor C8 which are connected in series with each other between conductors 68 and 69. A second resistor R9 connects the junction between resistor R7 and capacitor C8 and that between photocell PC1 and the neon lamp N. The other terminal 72 of the diode bridge 60 is connected by conductor 73 to the other one of the customer lines 12b.

The normal telephone central office battery voltage applied to the lines 12a and 12b, which is in the order of 48 volts, D.C., is insufficient to fire the neon lamp N so that the coupling circuit 14 is normally inactive and conductors 68 and 69 are effectively open circuited. High dialing and ringing peak voltages, which may be in the order of 400 volts, are of insufficient duration to cause operation of the coupling circuit 14.

When the remote transmitter exciter 18 is actuated, however, a voltage of approximately 200 volts is applied between the lines 12a and 12b. As a result, sufficient charge will accumulate in capacitor C8 to break down neon lamp N, causing the latter to illuminate the photocell PC1. This, in turn, causes the photocell PC1 to go from a high impedance state to a low impedance state, thereby connecting the conductors 68 and 69. As long as the input voltage signal is greater than the lamp breakdown voltage, lamp N will remain illuminated so that coupling circuit 14 will, in effect, remain latched in its conductive, or active, state.

The lamps 27 and 28 have a common terminal connected by conductor 75 to conductor 73. In addition, the other terminal of lamp 28 is connected to bridge output terminal 64 by resistor R10, and the other terminal of lamp 27 is connected to bridge output terminal 63 through an RC time delay circuit 76. The latter circuit includes resistors R11 and R12 and capacitor C9 which are connected in series between diode bridge terminal 63 and conductor 75. In addition, resistor R14 and photoresistor PC2 are connected to the other terminal of lamp 27 and to the junctions between resistors R11 and R12 and between resistor R12 and capacitor C9, respectively.

When the photocells 48, 48a 48b and 48c are not illuminated, they are in a high impedance state so that the capacitors C1, C2, C3 and C4 are effectively open circuited, and the oscillator 61 sees merely the capacitance of C5. When either of the lamps 27 or 28 is energized, only those photocells which are opposite holes 30 will be illuminated and thereby go from a high impedance state to a low impedance state. Thus, those capacitors connected in series with an illuminated photocell will be effectively connected in parallel with capacitor C5 so that the oscillator 61 sees a higher value of total capacitance.

Preferably, capacitors C1, C2, C3 and C4 each have a different predetermined capacitance which are related so as to provide a different parallel capacitance with respect to capacitor C5 for each position of the discs 20 and 21. For example, capacitors C1, C2, C3 and C4 may be 1 nf., 2 nf., 4 nf. and 8 nf., respectively, as shown in FIG. 7, so as to provide the indicated parallel capacitance for each disc position.

As those skilled in the art will appreciate, the frequency of the oscillator 61 will be given by the expression:

$$f \cong \frac{1}{2\pi\sqrt{LC}}$$

where $$C \cong \left(\frac{1}{C6} + \frac{1}{C5 + C_n}\right)^{-1}$$

and $C_n$ is the sum of the capacitances C1, C2, C3 and C4 that are connected in parallel with capacitance C5 as the result of their respective photocells 48, 48a, 48b and/or 48c being illuminated through the holes 30 in discs 20 or 21. As a result, the oscillator 61 will have a different output signal for each position of the discs 20 and 21.

Assume that a reading of the meter 11 is to be taken.

The interrogator 15 is actuated, and this, in turn, actuates the remote transmitter exciter and the line selector which selects the customer lines 12a and 12b. The remote transmitter exciter places a positive potential signal on the line 12a and a negative potential signal on line 12b. Capacitor C8 will charge to a sufficiently high voltage to break down the neon lamp N. This illuminates the photocell PC1 which then changes from a high impedance state to a low impedance state, whereby current may continue to flow to lamp N. With the photocell PC1 in its low impedance state, the lamp N will remain illuminated as long as the voltage signals appear in the customer lines 12a and 12b.

When the coupling circuit becomes active, a voltage appears across the diode bridge output terminals 63 and 64 which energizes the oscillator 61. In addition, this voltage, less the small drop across diode D4, appears across the lamp 27 time delay circuit 76, which momentarily prevents lamp 27 from illuminating. The voltage across lamp 28 will be that across the diode D1 and this will be insufficient to break the lamp down. Initially, therefore, only capacitors C5 and C6 will be in the oscillator 61 circuit and, accordingly, a reference frequency signal will be placed on the lines 12a and 12b and received by the interrogator 15. After a time delay determined by the values of resistance and capacitance in the time delay circuit 76 and the lamp 27 breakdown voltage, the lamp 27 is illuminated and predetermined ones of the photocells 48, 48a, 48b and 48c will be illuminated in accordance with the position of the disc 20. This will modify the capacitance seen by the oscillator 61 and, accordingly, a second frequency signal will be applied to the lines 12a and 12b to indicate the position of the disc 20.

It will be appreciated that the frequency of the second signal will be some increment below that of the first or reference frequency signal. By thus reading the disc position as a predetermined variation or percentage of the reference frequency rather than as a discrete frequency, variations in capacitive values as the result of ageing, for example, will not prevent unambiguous readings.

After the disc 20 reading has been received, the remote transmitter exciter will reverse the polarity of the customer lines 12a and 12b so that lamp 28 will be energized through conductor 75, resistor R10 and diode D3. Diode D2, however, will prevent energization of the lamp 27. As a result, a reading may be taken on the position of the disc 21. Here again, certain of the photocells 48, 48a, 48b and 48c may be illuminated in accordance with the position of the disc 21 so that certain ones of the capacitors C1, C2, C3 and C4 may be connected in parallel with the capacitor C5. This will again provide a tone signal in accordance with the reading of the disc 21 to the customer lines 12a and 12b which is received by the interrogator 15.

The diode bridge 60 performs the function of signal receiving and mode selection. More specifically, the bridge 60 receives the actuating signals from the remote transmitter exciter 16 and selects which of the lamps 27 and 28 will be energized so that the discs 20 and 21 may be selectively read.

Because the disc 21 makes sixteen steps for each step of the disc 20, a total of 256 steps of the meter 11 is possible for each encoder register cycle. If meter readings of a greater number of steps per cycle are desired, the discs 20 and 21 may be made with a greater number of code units 30 and 31 and sensor units 48, or an additional set of discs, lamps and sensor units may be provided.

It will be appreciated that the encoder unit according to the invention provides a compact and economical structure which is suitable for a remote meter reading installation wherein space and installation costs are extremely important. For example, the device according to the invention, requires only a single sensor assembly for reading a pair of discs 20 and 21.

Further miniaturization is possible because of the use of the capacitive incrementing circuit 59 which allows the positions of both discs 20 and 21 to be read through a single pair of conductors 65 and 67. It will also be appreciated that additional discs could also be read through conductors 65 and 67 by providing further selectively operable lamps and/or additional photocells or capacitive incrementing circuits 59, having different capacitive values so that different tone signals will be produced.

Also, the use of the capacitor incrementing circuit 59, consisting of capacitors C1, C2, C3 and C4 which are switched through photocells 48, 48a, 48b and 48c, respectively allows the addition and subtraction of discrete values of capacitance without the use of expensive switching devices. This further facilitates the compactness and economics of the encoder 10.

In addition, the combination of the capacitance incrementing circuit with the oscillator permits the use of a single tone signal to represent a plurality of information bits rather than a different tone signal for each information bit as in some prior art devices.

While only a single embodiment of the invention has been shown and described, it is not intended to be limited thereby, but only by the scope of the appended claims.

I claim:

1. A device for indicating the position of a movable member and including at least a pair of adjacently disposed carriage members, a code track disposed on each carriage member for defining a plurality of positions, sensing bit means disposed between said members and in an operative association with each of said code tracks, said carriage members being coupled to said movable member for being moved into said positions of said code tracks relative to said sensing bit means, normally inactive means associated with said carriage members and operative when active to selectively actuate said sensing bit means in a predetermined different manner for each position of carriage members.

2. The device set forth in claim 1 wherein each of said carriage members is rotatable and said code track is disposed in a circular array thereon.

3. The device set forth in claim 1 wherein said code track comprises transparent and opaque positions and said sensing bit means includes photosensitive means arranged in registry with different predetermined ones of said positions when said carriage members are in each of their positions, and said normally inactive means comprises a source of illumination.

4. The device set forth in claim 1 wherein said normally inactive means includes a first and second element associated with said first and second carriage means respectively, and first means for selectively actuating said normally inactive elements and second means for simultaneously interrogating said sensing bit means.

5. The device set forth in claim 1 wherein drive means couples a first one of said carriage members to said movable member for sequential advancement through said positions, said drive means also coupling said carriage members for movement of said second carriage member through one position for each cycle of said first carriage member.

6. The device set forth in claim 4 wherein said photosensitive means comprises a plurality of photocells constructed and arranged to be actuated by illumination from each of a pair of opposite directions.

7. The device set forth in claim 5 wherein said code track comprises transparent and opaque positions on said discs and said sensing bit means includes photosensitive mean arranged in registry with different predetermined ones of said positions when said discs are in certain of their positions, said normally inactive means comprises first and second lamp mean disposed adjacent the outer surfaces of said carriage members, first means for selectively energizing said lamps and second means for simultaneously interrogating said sensing bit means.

8. The device set forth in claim 7 wherein said photosensitive means comprises a plurality of photocells constructed and arranged to be actuated by illumination from each of a pair of opposite directions.

9. The device set forth in claim 8 wherein said carriage member comprises a disc and said code track is disposed in a circular array thereon.

10. The device set forth in claim 8 wherein said transparent portions comprise apertures defined by generally radial sides.

11. The device set forth in claim 10 wherein each of said photocells comprises a photosensitive material deposited on a transparent substrate.

References Cited

UNITED STATES PATENTS

| | | | |
|---|---|---|---|
| 2,808,518 | 10/1957 | Koonz | 250—219 X |
| 2,894,146 | 7/1959 | Crotty et al. | 250—231 |
| 3,253,153 | 5/1966 | Stoddard | 250—231 X |
| 3,311,824 | 3/1967 | Pitt | 340—190 X |

WALTER STOLWEIN, Primary Examiner

U.S. Cl. X.R.

250—209; 340—190